United States Patent [19]

Rothen

[11] Patent Number: 4,887,636

[45] Date of Patent: Dec. 19, 1989

[54] APPARATUS FOR THE CONTINUOUS CONTROL OF SOLENOID VALVES WHICH ARE NORMALLY DESIGNED FOR INTERMITTENT OPERATION

[75] Inventor: Johann Rothen, Sarstedt, Fed. Rep. of Germany

[73] Assignee: WABCO Westinghouse Fahrzeugbremsen GmbH, Hanover, Fed. Rep. of Germany

[21] Appl. No.: 822,355

[22] Filed: Jan. 24, 1986

[30] Foreign Application Priority Data

Jan. 24, 1985 [DE] Fed. Rep. of Germany ....... 3502276

[51] Int. Cl.⁴ ............................................ G05D 16/00
[52] U.S. Cl. .............................. 137/487.5; 137/596.17
[58] Field of Search ........... 137/487.5, 624.13, 624.15, 137/596.17

[56] References Cited

U.S. PATENT DOCUMENTS

| 3,874,407 | 4/1975 | Griswold | 137/596.17 |
| 4,241,750 | 12/1980 | Furuse et al. | 137/101.19 |
| 4,253,480 | 3/1981 | Kessel | 137/487.5 X |

FOREIGN PATENT DOCUMENTS

| 0075657 | 6/1982 | European Pat. Off. |
| 2902337 | 7/1980 | Fed. Rep. of Germany |
| 2930433 | 5/1981 | Fed. Rep. of Germany |
| 3102928 | 12/1981 | Fed. Rep. of Germany |
| 2293736 | 7/1976 | France |
| 53136187 | 11/1978 | Japan |
| 5591005 | 10/1980 | Japan |
| 1366617 | 9/1974 | United Kingdom |
| 1534435 | 12/1978 | United Kingdom |
| 2069728 | 8/1981 | United Kingdom |

Primary Examiner—Alan Cohan
Attorney, Agent, or Firm—J. B. Sotak

[57] ABSTRACT

Apparatus for continuously controlling an electrically-actuated solenoid valve which regulates the fluid pressure conveyed to a brake cylinder. The solenoid valve is designed for intermittent operation. A pressure transducer senses and generates an actual value signal, which is proportional to the pressure to be regulated. A set value generator produces a select set value signal. A comparator device generates a pulse-type control signal having a variable width repetition rate within a certain pressure range for the solenoid valve in accordance with the difference between the actual value signal and the set value signal. In order to regulate the pressure more precisely and more quickly, without dependence on outer influences, the comparator device generates the control signal for controlling the solenoid valve within a predetermined initial pressure range, in accordance with the actual value pressure sensed by the pressure transducer in such a way that the solenoid valve is slightly opened by being pulsed from a closed-valve position.

5 Claims, 3 Drawing Sheets

APPARATUS FOR THE CONTINUOUS CONTROL OF SOLENOID VALVES WHICH ARE NORMALLY DESIGNED FOR INTERMITTENT OPERATION

FIELD OF THE INVENTION

The invention relates to an apparatus for continually controlling an electrically-activated magnet or solenoid valve which is operated intermittently for regulating the pressure supplied to an air brake cylinder by sensing the actual pressure and producing an actual value pressure signal which compares to a set value signal.

BACKGROUND OF THE INVENTION

It has been found that brake pressure regulators which have been in use in the past employ electrically-controlled solenoid inlet and discharge valves, which were always completely closed and completely opened by the control signals, in order to maintain the pressure at the desired value. This adversely affects the precision of the regulation, and the amount of air consumption is relatively high when used in compressed air brake systems. Further, the life-expectancy of the solenoid valves is reduced by the high number of switching actuations.

A brake pressure regulator for pneumatic vehicle brakes, which avoids the necessity of completely opening and closing the solenoid valves, is shown and disclosed in published German patent application DE-OS 29 02 337. This latter type of regulator is designed with the possibility of modulating the pulse width of the control signals for the solenoid valves by superimposing onto the signal of a set value pressure. The set value pressure signal is compared to a signal, which is comparable to a measured actual value pressure, to produce an alternating voltage. In this manner, a gradual reduction of the pulse width repetition rate to 0.5 with deviation of 0 is obtained.

The fact that it is practically impossible to cause complete actuation of the solenoid valves at low frequencies, is disadvantageous. It results in great deviations and short downtimes for the electromagnets. With high-frequency alternating voltage signals, the solenoid valves are only opened very little with small deviations, and the precise adjustment requires many pulse cycles. The timing of the control cannot be controlled with accuracy. The valve would have to be completely closed, before the solenoid valve can be opened sensitively (also in small steps) by exactly measured timing of the control. Another disadvantage lies in the dependence on influences such as coil temperature, voltage, process tolerances, etc.

A literary paper on "Proportional Pressure Regulating Valves NG 4", published by the Herion-Werke KG Company, discloses a proportional pressure-regulating valve (which is known to the art) in which the secondary pressure is adjusted by a change in the magnetic force which causes a displacement of the piston. The size of this displacement is given as a voltage signal by an electrical set value. The signal is sent to the input side of an amplifier. The output current is obtained, proportional to the input voltage, at the output side of the amplifier. When sent to the magnet, this current results in a pneumatic output signal proportional to the magnetic force. Manufacture of this known pressure-regulating valve, in large numbers, is too expensive, due to the required very-precise alignments. In addition, this known valve does not operate with enough precision, since no pressure sensor has been provided. The valve is also highly dependent on outside influences.

OBJECTS AND SUMMARY OF THE INVENTION

An object of the present invention is the design of a device (as mentioned initially) in such a way that a more precise and faster pressure-regulation, without the dependency on outer influences, is possible with the aid of the discontinuous solenoid valve.

It is a further object of this invention to provide an inexpensive and highly-precise pressure control solenoid-operated apparatus for an air brake system.

Another object of this invention is to provide an apparatus for the continuous control of an electrically-actuated solenoid valve for controlling of a pressure which is normally designed for intermittent operation comprising, a pressure transducer for generating an actual value signal which is proportional to the pressure to be controlled, a pressure set value adjuster for generating a set value signal, and with a device for the generation of pulse-type control signals with variable pulse-width repetition rate within a certain pressure range for the solenoid valve in accordance with the difference between the actual value signal and the set value signal, and a comparator for generating control signals for controlling the solenoid valve within a predetermined initial pressure range in accordance with the actual value pressure signal produced by the pressure transducer in such a way that the solenoid valve is slightly opened by being pulsed from a closed-valve position.

By employing the objects, in accordance with the invention, a fast and precise pressure-regulation of inexpensive intermittent operation of solenoid valves becomes possible in which, overcontrol is impossible. It will be appreciated that certain influences, like temperature changes, voltage changes, etc., do not have to be measured and taken into account. Manufacturing tolerances have little, or no effect. The achievement of the objects, in accordance with the invention, provides for an automatic compensation of these influences. A particular advantage lies in the fact that the life-expectancy of the solenoid valves is considerably raised, because the solution (in accordance with the invention) causes the solenoid valve to be intermittently-operated rather than continuously-operated. The pulse width of the control signals is adapted to the respective deviation. The increase of the actual value signal is limited to a very small range. The valve seat is subjected to very little wear, since very little movement occurs in the solenoid valve during pulse operation, i.e., it opens very little. It should be noted that this movement takes place from the closed position, and not from the open position.

BRIEF DESCRIPTION OF THE DRAWINGS

The above objects and other attendent features and advantages will become more readily understood from the following detailed description of the invention, when considered in conjunction with the accompanying drawings, wherein.

DETAILED DESCRIPTION OF THE INVENTION

Figure 1:
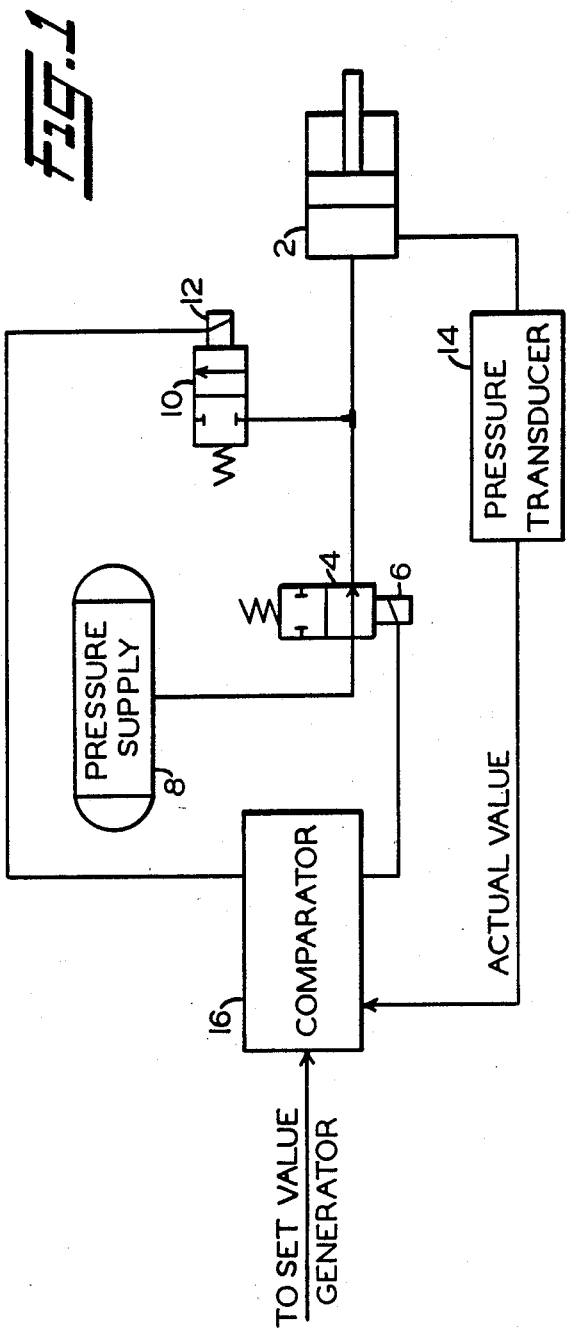
FIG. 1 is a schematic circuit block diagram of a pneumatic brake pressure-regulation arrangement, having apparatus for controlling a pair of solenoid valves, in accordance with the present invention.

It will be noted that the brake pressure-regulation apparatus (shown in FIG. 1) includes a brake operating cylinder 2 which is actuated by a suitable source of fluid pressure. The pressure, which is to be regulated, is connected to a pressure supply source or reservoir 8, by way of an inlet valve 4 having an electromagnetic coil 6. The regulated pressure is also connected to a pressure receptacle (not shown) by way of a discharge valve 10 having an electromagnetic coil 12. The brake pressure present in the brake cylinder 2 is sensed and measured by a pressure transducer 14. An actual value signal, which is proportional to the measured pressure, is produced by transducer 14. This actual value signal is compared to a set value signal by a comparator device 16 to control the electromagnetic or solenoid valves. The comparator 16 generates control signals, which are dependent on the deviation of the actual value signal from the set value signal, and are fed to the control of the magnet coils of the inlet and discharge valve.

The function and operation of the apparatus of FIG. 1, in accordance with the invention, will be described with reference to FIGS. 2 and 3.

Figure 2:
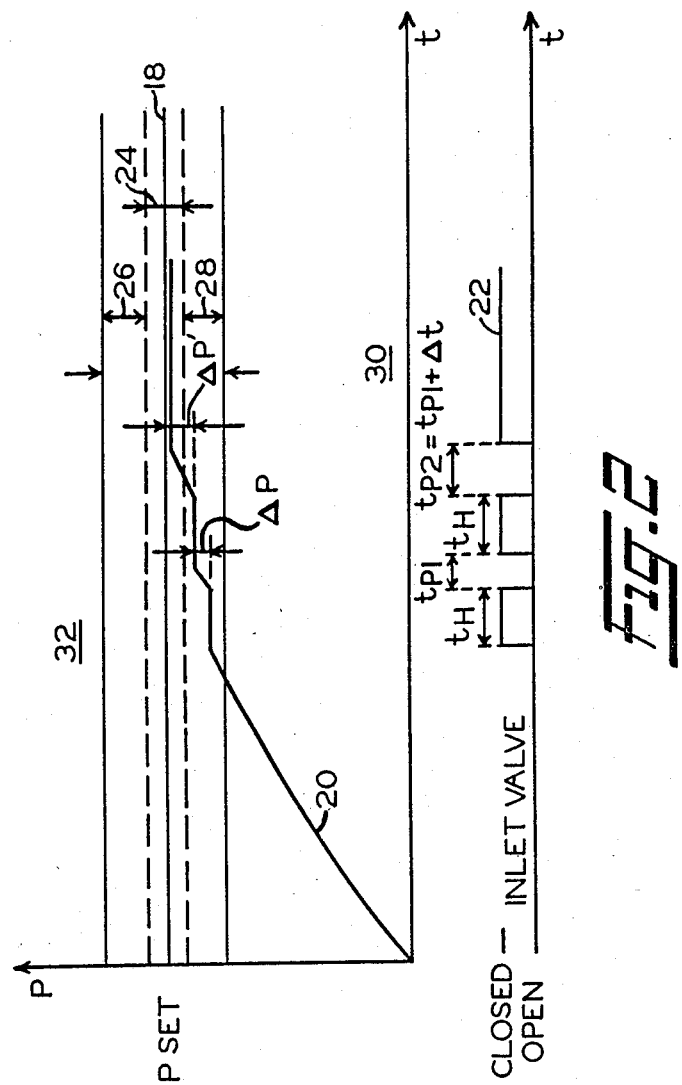
FIGS. 2 and 3 are graphic illustrations of the resultant curves, in response to the control signals "open" and "close" positions of the electrically-actuated solenoid inlet valve, as generated by the apparatus in accordance with the present invention.
Figure 3:
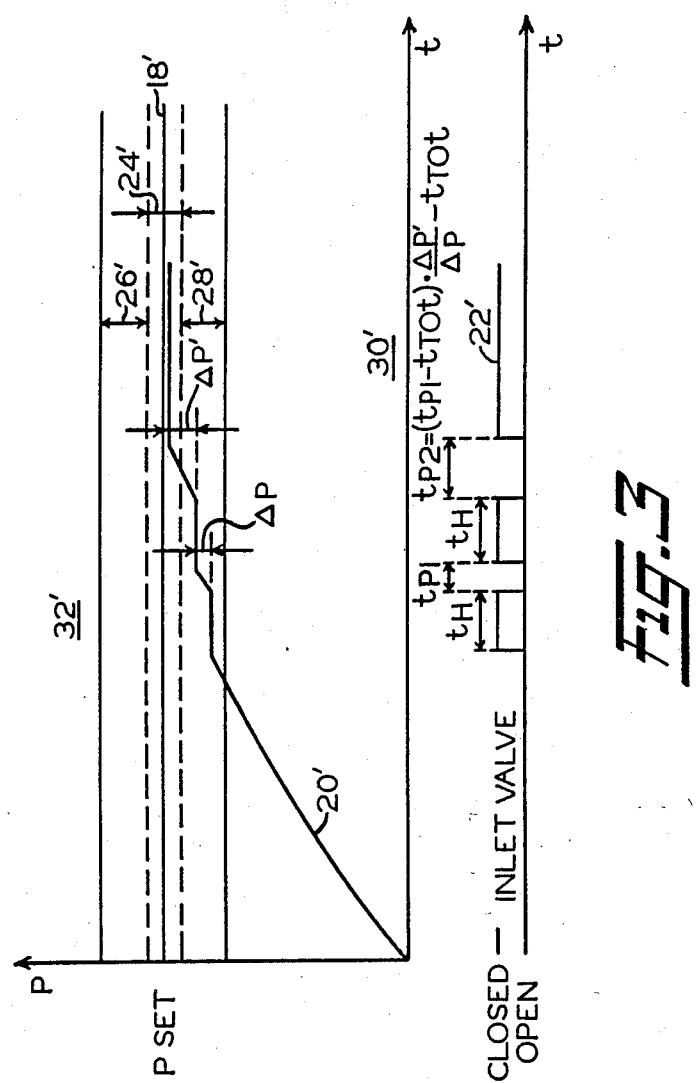

FIGS. 2 and 3 represent the pressure-distribution, or flow, in relation to the control signals supplied to the solenoid valves. Reference characters 18, 18' refer to the set, or desired, value pressure, while the characters 20, 20' refer to the actual, or ideal, value pressure. The reference characters 22, 22' depict the control signals conveyed to the inlet valve 4. Two pressure study ranges 26, 28 and 26', 28' are located on either side of the pressure hold-in ranges 24, 24'. There are further ranges 30, 30' in which the inlet valve is completely open, and ranges 32, 32' in which the discharge valve is completely open.

When the actual value pressure, which is measured by the pressure transducer 14, lies below the study range and 28', respectively (i.e., below the pressure range $P_{set}$-P study range), the inlet valve is completely open. When the actual value reaches the border of the study range, the inlet valve is closed by comparator 16 for a period $t_H$. After this period $t_H$, the comparator 16 opens the inlet valve for pressure feeding over an initial pulse period $t_{p1}$, and then the comparator 16 closes the inlet valve again for a period $t_H$.

The initial value $t_p$ of the pulse period is set up in such a way that, the pressure increase $\Delta p$ can only rise until the pressure study range is reached, taking into account the most disadvantageous conditions (as far as known) with regard to temperature, voltage, pressure, etc. As a rule, the actual value pressure remains at the study range after termination of the pulse period $t_{p1}$. If the pressure increase remained below a predetermined lower differential pressure change $\Delta p1$ (50 millibar, for instance), a renewed pulse-type pressure feed occurs by way of the comparator 16, in order to increase the pressure for a pulse period $t_{p2} = t_{p1} + \Delta t$, which has been increased by a predetermined period $\Delta t$ (0.5 millisec., for instance). If this pulse period causes an incremental pressure change $\Delta p1$ to be exceeded, and pulsing continues with pulse period $t_{p2}$, until the pressure study range 26 is reached, in this case, the inlet valve is closed.

If, in the study range 26, during pulse period $t_{p1}$, an upper differential pressure $\Delta p2$ (100 millibar, for instance) is exceeded, the pulse period is decreased by $\Delta t$ for the following pressure-feed phase, until the pressure lies within the incremental pressure $\Delta p2$ again.

Thus, as long as the actual pressure remains within the study range, the pulse period $t_{p2}$ is used as a new initial value, and possibly corrected or increased, respectively, as required for correction in accordance with the measured pressure differences, by $\Delta t$, until the pressure hold-in range 24 has been reached.

Referring now to FIG. 3, there is shown a modified version of the comparator 16. The pressure transducer 14 is, in this embodiment, controlled in such a way that it measures the pressure increase $\Delta p1$ in the known pulse period $t_{p1}$. In addition, the difference pressure $\Delta p2$, up to the set value pressure, is determined. The new pulse period $t_{p2}$ is then calculated from, $$t_{p2} = (t_{p1} - t_{Tot}) \cdot \Delta p2 / \Delta p - t_{Tot}$$

where $t_{Tot}$ refers to the downtime, or non-operative. The pulse width of the next control pulse is calculated in accordance with this new determined pulse period, if the pressure hold-in range is reached.

The advantage of the functional operation of FIG. 3, as opposed to the functional operation of FIG. 2, consists in the fact that less pulse cycles are required to reach the pressure hold-in range, particularly in the upper pressure range.

It will be understood that various alterations and changes may be made by those skilled in the art without departing from the spirit and scope of the subject invention. Therefore, it will be appreciated that certain modifications, ramifications, and equivalents will be readily apparent to a skilled artisan and, accordingly, it is understood that the present invention is not to be limited to the exact embodiment shown and described, but should be afforded the full scrope and protection of the appended claims.

What is claimed is:

1. Apparatus for the continuous control of an electrically-actuated solenoid valve for controlling a pressure which is normally designed for intermittent operation comprising, a pressure transducer for generating an actual value signal which is proportional to the pressure to be controlled, a pressure set value adjuster for generating a set value signal, a comparator device for the generation of pulse-type control signals with variable pulse width repetition rate within a given pressure range for controlling the solenoid valve in accordance with the difference between the actual value signal and the set value signal, and said comparator device generating control pulses for controlling the solenoid valve within a predetermined initial pressure range in accordance with the actual value pressure signal produced by the pressure transducer in such a way that the solenoid valve is slightly opened by being pulsed from a closed valve position, wherein the pulse width $t_p$ of the control pulses can be changed in accordance with the measured pressure changes $\Delta p$ so that the measured pressure change is compared to lower and upper values for the differential pressure changes $\Delta p1$, $\Delta p2$ and so that the pulse width is changed by a certain value of time $\Delta t$ when the lower or upper value is exceeded.

2. The apparatus, in accordance with claim 1, wherein the pulse width is increased when the lower value is exceeded, and decreased when the upper value is exceeded.

3. The apparatus, in accordance with claim 2, wherein the control pulses are generated until a second pressure level is reached, in which the pressure is maintained by closing the solenoid valve.

4. The apparatus, in accordance with claim 1, wherein the pulse width $t_p$ of the control pulse is changed in accordance with the pressure change $\Delta p$, determined during the pulse period or a previous control pulse, as well as on the difference pressure $\Delta p^2$ between the actual value pressure and the set value pressure.

5. The apparatus, in accordance with claim 4, wherein the pressure change $\Delta p$ is determined during the pulse period of the first control pulse.

* * * * *